United States Patent
Habermann et al.

[15] 3,696,152
[45] Oct. 3, 1972

[54] HYDRATION OF NITRILES TO AMIDES USING HETEROGENEOUS CUPREOUS CATALYSTS

[72] Inventors: Clarence E. Habermann, Mary R. Thomas, both of Midland, Mich. 48640

[73] Assignee: The Dow Chemical Company, Midland, Mich.

[22] Filed: June 17, 1970

[21] Appl. No.: 47,166

[52] U.S. Cl.........260/561 N, 260/558 R, 260/561 R, 260/561 R
[51] Int. Cl............................................C07c 103/08
[58] Field of Search......................260/561 R, 561 N

[56] References Cited

UNITED STATES PATENTS 3,631,104  12/1971  Habermann et al. ...260/561 N

FOREIGN PATENTS OR APPLICATIONS 203,812  9/1923  Great Britain.........260/561 R
957,560  5/1964  Great Britain.........260/561 R

*Primary Examiner*—Lewis Gotts
*Assistant Examiner*—Ethel G. Love
*Attorney*—Griswold and Burdick, Herbert D. Knudsen and C. E. Rehberg

[57] ABSTRACT

Cupreous catalysts prepared by reducing a mixture consisting essentially of copper oxide in combination with certain metal oxides have been discovered to be excellent heterogeneous catalysts for the hydration of nitriles to the corresponding amide.

17 Claims, No Drawings

HYDRATION OF NITRILES TO AMIDES USING HETEROGENEOUS CUPREOUS CATALYSTS

BACKGROUND OF THE INVENTION

The hydration of a nitrile in the presence of water with a heterogeneous catalyst to form a corresponding amide is known. Haefele in U. S. Pat. No. 3,366,639 teaches such a conversion of a nitrile to the amide by means of a manganese dioxide catalyst. Watanabe in Bull. Chem. Soc. Japan, 32, 1280 (1959); 37, 1325 (1964); and 39, 8 (1966) taught the use of copper chloride reacted with zinc, nickel chloride reacted with zinc, stabilized nickel, zinc oxide, copper chromium oxide, and mixtures of copper oxide and nickel oxide as catalysts to convert benzonitrile to benzamide.

SUMMARY OF THE INVENTION

It has now been found that a nitrile may be hydrated to the corresponding amide by contacting the nitrile in the presence of water with a cupreous catalyst prepared by reducing a mixture of copper oxide and certain metal oxides. Use of these catalysts gives high conversions, high yields and long catalyst life.

The important aspect of the present invention is the discovery of new cupreous catalysts useful for the catalytic conversion of a nitrile to the corresponding amide. Mixtures of copper oxides and metal oxides have a number of potential names. Following the example set by Stroupe in J.A.C.S., 71, 569 (1949) for mixtures of copper oxide and chromium oxide which were called copper-chromium oxide, the catalysts of the invention which are similar mixtures of oxides are defined herein as copper-metal oxides. Such names as used hereinafter mean copper oxide in combination with at least one metal oxide in any proportions as long as about 0.5 percent of each component is present.

The basic component of all mixtures which are reduced to form the catalysts of the invention is copper oxide. This component of the mixture may be cupric or cuprous oxide or mixture thereof. Copper-metal oxides containing about 10 percent or more by weight of copper oxide for unsupported catalysts are preferred in the invention, with supported catalysts, of course containing proportionally smaller amounts of copper oxide based on total catalyst weight, also being preferred. Representative examples of suitable supports for the catalysts include alumina, silica, silica gel, charcoal, magnesia, chromia, iron oxide and clays.

In addition to the copper oxide, the catalysts of the present invention contain a metal oxide or mixture thereof. Metal oxides suitably used in the mixture to prepare the catalyst of the present invention are oxides of elements in Group IIA having an atomic number of 4 to 56, Group IIIA having an atomic number of 13 to 81, Group IVA having an atomic number of 14 to 82, Group IIB having atomic numbers of 30 to 80, Group IIIB having an atomic number of 21 to 94, Group IVB having an atomic number of 22 to 72, Group VB having an atomic number of 23 to 73, Group VIB having an atomic number of 24 to 74, Group VIIB having atomic numbers of 25 and 75 and Group VIII having atomic numbers of 26 to 78 based on the Periodic Chart of the Elements found in the Handbook of Chemistry and Physics, 41st Edition. Preferred metal oxides are not substantially reduced to the free element in the presence of hydrogen at temperatures of 100° to 300°C., with metal oxides which are not substantially affected even when heated in hydrogen to about 500°C. being especially preferred.

Representative examples of these suitable metal oxides include the oxides of Be, Mg, Ca, Sr, Ba, Sc, Y, La, Ce, Pr, Nd, Sm, Eu, Gd, Tb, Dy, Ho, Er, Tm, Yb, Lu, Ac, Th, Pa, U, Np, Pu, Ti, Zr, Hf, V, Nb, Ta, Cr, Mo, W, Mn, Re, Fe, Ru, Os, Co, Rh, Ir, Ni, Pd, Pt, Zn, Cd, Hg, Al, Ga, In, Tl, Si, Ge, Sn and Pb. The oxides of these elements are known and available or may be prepared as mixtures with copper oxide by one or more of the methods described below. Of these representative metals, oxides of Hg, La, Zr, Cd, Al, Pb, Cr, Mg, Fe, Si, W, Th, Ce, Y, Mn, Co, Ni and Zn are preferred because of their effectiveness in the hydration. Especially preferred metal oxides are the oxides of La, Al, Cr, Mg, Mn, Si, Co, Ni, and Zn because of their demonstrated high conversions and yields in batch processes.

The catalysts of the invention may suitably be made by precipitating insoluble salts of copper and the metal in such manner that when the resultant product is decomposed, the desired oxide mixture is obtained. Such oxide mixture is then reduced. Alternatively, the decomposition and reduction of these products, especially the carbonates and oxalates, may be carried out simultaneously. For example, solutions of copper nitrate and ammonium chromate may be mixed to form a precipitate of copper ammonium chromate, and the precipitate may then be decomposed to give a copper-chromium oxide which when activated with hydrogen is a catalyst of the invention. Also soluble nitrates such as copper nitrate and zinc nitrate may be precipitated with sodium or ammonium carbonate to form the copper-zinc carbonate which may be decomposed to give the corresponding copper-zinc oxide mixture which is reduced and used as the catalyst. The mixtures prior to reduction may also be prepared by mixing and grinding the oxides of the various elements or by other known preparation techniques. The coprecipitation of the copper salt with the corresponding metal salt is an especially preferred method of obtaining the unreduced mixture of oxides. When reduced, these oxide mixtures make catalysts which have an extended life time and high activity which makes them especially suited to commercial production of amides.

In the reduction of the oxide mixture, the interrelationship of temperature, reaction time, nature of the reducing agent and quantity of reducing agent used control the amount of reduction and the oxidation state to which the oxide mixtures are reduced to form the catalyst. The copper oxide is at least partially reduced in the hydrogen activation whereas the especially preferred metal oxides are substantially unaffected under the conditions. To reduce the copper oxide, temperatures of about 50° to about 500°C. or more may suitably be used, with temperatures of about 100° to about 300° being preferred. The reaction time and the amount of reducing agent used may vary widely. As more reduction is desired, longer reaction time, stronger reducing agents and more reducing agent are employed.

Although the reduction of the oxide mixture with hydrogen is preferred, other reducing agents may also be employed to prepare the catalyst. For example, the catalyst may be reduced by contacting the oxides with ammonia, hydrazine, carbon, carbon monoxide, a lower alkane or a lower alkanol or other reducing agent.

The extent of the reduction of the oxide mixtures of the invention may vary widely and is essentially dependent upon the amount of reducible oxide in the oxide mixture. The amount of reduction with hydrogen may be monitored by measuring the quantity of hydrogen taken up by the oxide mixture, by observing the amount of water formed in the reduction or by determining the weight loss of the oxide mixtures. In the activation at least enough reduction of the oxide mixture must take place to materially increase the activity of the catalyst in the conversion of nitriles to amides. This amount of reduction may be as low as the consumption of hydrogen required to convert about 1 percent of the copper oxide to copper metal. Substantially greater reduction of the copper oxide, however, is preferred and complete reduction of the copper oxide still gives a desirable catalyst. Activation with hydrogen wherein enough hydrogen reacts to convert more than about 40% of the copper oxides in the mixture to copper metal is preferred, with the reaction of enough hydrogen to convert about 75 to about 98 percent of the copper oxides to the metal being especially preferred because of the beneficial affect on the activity and the longevity of the catalyst produced. Oxide mixtures containing more than one reducible oxide, of course, require the reaction of more hydrogen to obtain these percentage reductions. When another reducing agent is employed, the reduction of the same percentage of the copper oxide is preferred although monitoring the extent of the reduction requires different techniques. Although these limits describe the amount of reducing agent that reacts with a particular catalyst, the mechanism of the reduction and the final oxidation state of the components of the catalyst is not fully understood, and these percentage amounts should not be read to require a certain percentage of metallic copper.

The catalysts of the present invention may suitably be used to convert a nitrile to the corresponding amide in either a batch or a continuous process. In either process, the nitrile and water are contacted with the catalyst under the appropriate reaction conditions and the amide product is then recovered. Since the catalysts of the present invention are essentially insoluble, heterogeneous catalysts, a continuous flow reaction is preferred.

In a continuous flow reaction, the solid catalyst of the invention is placed into a reaction chamber having an inlet for reactants and an outlet for products. The reaction chamber is maintained at the desired reaction temperature and the rate of flow of the reactants of the catalysts is controlled to give the desired contact of the reactants with the catalyst. The reactants may be fed over the solid catalyst as a gas or preferably as a liquid. The reaction product from the reactor may suitably be used as such or purified by any conventional technique.

The process of the present invention is suitably applicable to any nitrile, with aliphatic and aromatic hydrocarbon nitriles containing up to about 20 or more carbon atoms being preferred. For purpose of the invention, aromatic nitriles are defined as those nitriles having cyano groups attached to the aromatic nucleus. Representative examples of the suitable nitriles include: saturated aliphatic hydrocarbon nitriles such as acetonitrile, propionitrile, pentanonitrile, dodecanonitrile, succinonitrile, adiponitrile and the like; unsaturated aliphatic hydrocarbon nitriles such as acrylonitrile, methacrylonitrile, crotonic nitrile, $\beta$-phenylacrylonitrile, 2-cyano-2-butene, 1-cyano-1-octene, 10-undeconitrile, maleonitrile, fumaronitrile and the like; and aromatic nitriles such as benzonitrile, p-toluonitrile, $\alpha$-naphthonitrile, phthalonitrile and the like. Of the nitriles suitable for use in the invention, the olefinic nitriles of three to about six carbon atoms are especially preferred, with the conversion of acrylonitrile to acrylamide being of special interest.

The proportions of nitrile to water in the reactant mixture may vary widely. More important than the specific nitrile to water ratio is the extent of the interaction between the nitrile and water. A high degree of contact is desirable to assure the greatest efficiency in the reaction. For gaseous reactants, the nitrile and water are miscible in all proportions, but for liquid reactants, certain precautions may be necessary to insure that sufficient contact of the nitrile and water is maintained. The necessary contact may be realized by dissolving the nitrile in the water or by dissolving the water in the nitrile. Outside of the limits of the solubility of one of the reactants in the other, however, the reactant mixture may be agitated, a suitable solvent may be added or another means of increasing the contact of the reactants may be employed. Excess water is the preferred solvent although other inert solvents, such as dioxane, dimethyl sulfoxide, acetone, dimethyl ether of ethylene glycol or tetrahydrofuran, may also be used.

The temperature of the reaction may vary widely as different nitriles and catalysts are used in the invention. Generally, the reaction is conducted within a temperature range of about 0° to about 400°C. At temperatures below this range, the reaction is impractically slow. Above this range, the reaction forms an increasing amount of undesirable by-products. Within the broad temperature range, temperatures of about 25° to about 200°C. or more are preferred. For unsaturated nitriles which tend to polymerize, a reaction temperature of less than about 200°C. is desirable to avoid polymerization of the nitrile and possible poisoning of the catalyst.

The other reaction conditions and techniques for the use of heterogeneous catalysts are known and not critical to the invention. The important aspect of the invention is using the cupreous catalyst consisting essentially of a reduced mixture of copper oxide in combination with a refractory oxide to convert a nitrile to the corresponding amide. By applying these catalysts to the reaction, excellent yields of amide and long catalyst life are realized.

SPECIFIC EMBODIMENTS

Example 1

One liter of silicic acid solution was prepared by diluting 300 cc. of a 16 percent silicic acid sol sold under the trade name "Nalcoag 1015" with water. This solution was added to a beaker concurrently with a solution consisting of 115.4 g. of $Cu(NO_3)_2 \cdot 3H_2O$ in one liter of water and a third solution containing 50 g. of $(NH_4)_2CO_3$ in one liter of water. During the addition, the contents of the beaker were stirred continuously and a precipitate formed. The precipitate was filtered, dried at 85°C. and decomposed to the mixed oxide at 280°C. A 7.3 g. portion of this decomposed oxide was then placed in a furnace and heated slowly to 175°C. in a 640 cc./min. stream of 20 percent hydrogen and 80 percent nitrogen. The hydrogen flow was continued at 175° C. for 4 hours. One gram of the reduced catalyst along with 5 grams of a 7 percent aqueous acrylonitrile solution was added to a glass ampoule. The ampoule was sealed, heated for 1 hour at 80°C., cooled, opened and an aliquot was removed for analysis by gas-liquid chromatography. A conversion of 78 percent and a yield of acrylamide of 96 percent based on the acrylonitrile converted were obtained.

Example 2

In the same manner as shown by Example 1, a 4.3 percent tungstic acid sol made by passing an ammonium tungstate solution over a strong-acid cation-exchange resin in the hydrogen form, was used to prepare a reduced copper-tungsten oxide catalyst. In a hydration parallel to that of Example 1, the conversion of acrylonitrile was 17 percent, and the yield of acrylamide based on the converted acrylonitrile was 66 percent.

Examples 3–16

In parallel experiments, 0.85 mole of $Cu(NO_3)_2 \cdot 3H_2O$ and 0.15 mole of a salt having the general formula $M^{x+}(NO_3)_x$ were dissolved in 2 liters of water. A stoichiometric amount of ammonium carbonate required to precipitate the two salts was then dissolved in 2 liters of water, and the two solutions were added to a stirred vessel at a common rate. Stirring was continued for about a half an hour after the addition was complete. The resulting precipitate was collected by filtration, dried and decomposed at 280°C. to the corresponding copper-metal oxide. A small portion of the oxide mixture was then reduced at 175°C. in a stream of hydrogen containing 20 percent hydrogen and 80 percent nitrogen for 4 hours. One gram of the reduced catalyst was contacted with 5 ml. of a 7 percent aqueous acrylonitrile solution in a glass ampoule at 80°C. for 1 hour. An aliquot of the reaction product was then withdrawn and analyzed for the conversion of the acrylonitrile and the yield of acrylamide based on the conversion of the acrylonitrile. The results of these parallel experiments are shown in Table I.

TABLE I

Conversion of Acrylonitrile to Acrylamide Using Cupreous Catalyst Prepared by Reducing the Copper-metal Oxide with Hydrogen

| Example | $M^{x+}$ | VCN[1] Conv. | AA[2] Yield |
|---|---|---|---|
| 3 | $Hg^{2+}$ | 30.2 | 72.4 |
| 4 | $La^{3+}$ | 57.6 | 83.6 |
| 5 | $Zr^{4+}$ | 42.7 | 80.0 |
| 6 | $Cd^{2+}$ | 10.0 | 27.8 |
| 7 | $Al^{3+}$ | 88.8 | 94.0 |
| 8 | $Pb^{2+}$ | 24.1 | 46.1 |
| 9 | $Cr^{3+}$ | 56.0 | 92.9 |
| 10 | $Mg^{2+}$ | 52.9 | 88.6 |
| 11 | $Fe^{3+}$ | 40.2 | 80.5 |
| 12 | $Mn^{2+}$ | 49.0 | 95.0 |
| 13 | $Co^{2+}$ | 45.6 | 91.4 |
| 14 | $Ni^{2+}$ | 49.2 | 90.3 |
| 15 | $Zn^{2+}$ | 71.6 | 92.7 |
| 16 | $Y^{2+}$ | 10.8 | 42.0 |

[1] Acrylonitrile
[2] Acrylamide

In the same manner as shown by the examples, copper oxide may be combined with other metal oxides described above and used in the reduced form to convert acrylonitrile to acrylamide. Also, in the same manner as described in the examples for the conversion of acrylonitrile to acrylamide, other nitriles may be converted to the corresponding amide in the presence of the catalysts of the invention. For example, acetonitrile may be converted to acetamide, methacrylonitrile may be converted to methacrylamide, benzonitrile may be converted to benzamide, butyronitrile may be converted to butyramide and other nitriles may be converted to the corresponding amide by contacting the nitrile with a catalyst in the presence of water at a temperature of about 0° to about 400°C.

We claim:

1. The process for hydrating a nitrile to the corresponding amide comprising contacting the nitrile in the presence of water with a cupreous catalyst prepared by reducing with a reducing agent a mixture of copper oxide and a metal oxide or mixture thereof selected from the group consisting of the oxides of those elements in Group IIA having an atomic number of 4 to 56, Group IIIA having an atomic number of 13 to 81, Group IVA having an atomic number of 14 to 82, Group IIB having atomic numbers of 30 to 80, Group IIIB having an atomic number of 21 to 94, Group IVB having an atomic number of 22 to 72, Group VB having an atomic number of 23 to 73, Group VIB having an atomic number of 74, Group VIIB having atomic numbers of 25 and 75 and Group VIII having atomic numbers of 26 to 78.

2. The process of claim 1 wherein the metal oxide is one that is not substantially reduced to the free element and water in the presence of hydrogen at temperatures of about 100° to about 300°C.

3. The process of claim 2 wherein the metal oxide is one that is not substantially reduced in the presence of hydrogen at temperatures of about 500°C.

4. The process of claim 1 wherein the metal oxide is an oxide of Hg, La, Zr, Cd, Al, Pb, Mg, Fe, Si, W, Th, Ce, Y, Mn, Co, Ni, Zn or mixture thereof.

5. The process of claim 4 wherein the metal oxide is an oxide of La, Al, Mg, Mn, Si, Co, Ni, Zn, or mixture thereof.

6. The process of claim 1 wherein the mixture of oxides before reduction to form the catalyst contains more than about 10 percent by weight of copper oxide based on the total weight of the oxide mixture.

7. The process of claim 1 wherein the reducing agent is hydrogen.

8. The process of claim 1 wherein the reduction is conducted at a temperature of about 50° to about 500°C.

9. The process of claim 8 wherein the reduction is conducted at about 100° to about 300°C.

10. The process of claim 1 wherein enough of the reducing agent reacts in the preparation of the catalyst to convert more than about 40 percent of the copper oxide in the mixture of copper oxide and metal oxide to copper metal.

11. The process of claim 10 wherein enough reducing agent reacts to convert about 75 percent to about 98 percent of the copper oxide to copper metal.

12. The process of claim 1 wherein the nitrile is a hydrocarbon nitrile of up to about 20 carbon atoms.

13. The process of claim 12 wherein the nitrile is an olefinic nitrile of three to about six carbon atoms.

14. The process of claim 13 wherein the nitrile is acrylonitrile.

15. The process of claim 1 wherein the reaction is conducted at a temperature of about 0° to about 400°C.

16. The process of claim 15 wherein the temperature of the reaction is about 25° to about 200°C.

17. The process of claim 1 wherein the reaction is conducted in the liquid phase.

* * * * *